(12) United States Patent
Winarski et al.

(10) Patent No.: US 7,511,908 B2
(45) Date of Patent: *Mar. 31, 2009

(54) MAGNETIC-POLARITY ENCODED SERVO POSITION INFORMATION FOR MAGNETIC-BASED STORAGE MEDIA

(75) Inventors: Daniel Winarski, Tucson, AZ (US); Nils Haustein, Zornheim (DE); Craig A. Klein, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/283,223

(22) Filed: Nov. 18, 2005

(65) Prior Publication Data

US 2007/0115576 A1 May 24, 2007

(51) Int. Cl.
*G11B 5/09* (2006.01)
(52) U.S. Cl. .................. 360/48; 360/55; 360/71
(58) Field of Classification Search .................. None
See application file for complete search history.

(56) References Cited

U.S. PATENT DOCUMENTS

| | | | |
|---|---|---|---|
| 3,614,756 A | | 10/1971 | McIntosh et al. |
| 3,812,533 A | * | 5/1974 | Kimura et al. ............ 360/77.08 |
| 4,652,945 A | | 3/1987 | Marchant |
| 5,055,951 A | | 10/1991 | Behr |
| 5,291,348 A | | 3/1994 | Copolillo |
| 5,432,652 A | | 7/1995 | Comeaux et al. |
| 5,689,384 A | | 11/1997 | Albrecht et al. |
| 5,757,576 A | * | 5/1998 | Kosugi ............... 360/78.14 |
| 5,786,957 A | * | 7/1998 | Inoue et al. ............ 360/77.08 |
| 6,021,013 A | | 2/2000 | Albrecht et al. |
| 6,078,463 A | * | 6/2000 | Pahr ....................... 360/77.12 |
| 6,282,051 B1 | | 8/2001 | Albrecht et al. |
| 6,320,719 B1 | | 11/2001 | Albrecht et al. |
| 6,462,904 B1 | | 10/2002 | Albrecht et al. |

(Continued)

FOREIGN PATENT DOCUMENTS

CN 1610937 4/2005

(Continued)

OTHER PUBLICATIONS

Document dated Jun. 27, 2008 describing art cited in China Office Action of Jun. 27, 2008.

*Primary Examiner*—K. Wong
(74) *Attorney, Agent, or Firm*—Konrad Raynes & Victor LLP

(57) ABSTRACT

A magnetic storage media includes a magnetic south-north servo band section and a magnetic north-south servo band section. The magnetic south-north servo band section includes a magnetic south-pole polarity initialized servo track segment and a magnetic north-pole polarity servo pattern recorded on the magnetic south-pole polarity initialized servo track segment. The magnetic north-south servo band section includes a magnetic north-pole polarity initialized servo track segment, and a magnetic south-pole polarity servo pattern recorded on the magnetic north-pole polarity initialized servo track segment. The magnetic south-north servo band section and the magnetic north-south servo band section are recorded relative to each other on a servo track to represent magnetic polarity encoded servo position information based on the magnetic north-pole polarity servo pattern and the magnetic south-pole polarity servo pattern.

20 Claims, 11 Drawing Sheets

U.S. PATENT DOCUMENTS

| | | | |
|---|---|---|---|
| 6,781,778 B1 * | 8/2004 | Molstad et al. | 360/48 |
| 6,873,482 B1 | 3/2005 | Hsieh et al. | |
| 6,879,457 B2 | 4/2005 | Eaton et al. | |
| 6,970,312 B2 * | 11/2005 | Yip et al. | 360/48 |
| 7,106,544 B2 * | 9/2006 | Dugas et al. | 360/75 |
| 7,130,140 B1 * | 10/2006 | Boyer et al. | 360/48 |
| 7,142,388 B2 * | 11/2006 | Tateishi et al. | 360/77.12 |
| 7,199,957 B2 * | 4/2007 | Rothermel et al. | 360/48 |
| 7,224,544 B2 * | 5/2007 | Takano et al. | 360/66 |
| 7,230,790 B1 * | 6/2007 | Mallary et al. | 360/77.08 |
| 7,283,317 B2 * | 10/2007 | Dugas et al. | 360/48 |
| 2004/0174132 A1 | 9/2004 | Johnson et al. | |
| 2005/0057839 A1 | 3/2005 | Ohtsu | |
| 2005/0254170 A1 * | 11/2005 | Dugas et al. | 360/126 |

FOREIGN PATENT DOCUMENTS

| | | |
|---|---|---|
| WO | 03069600 | 8/2003 |

* cited by examiner

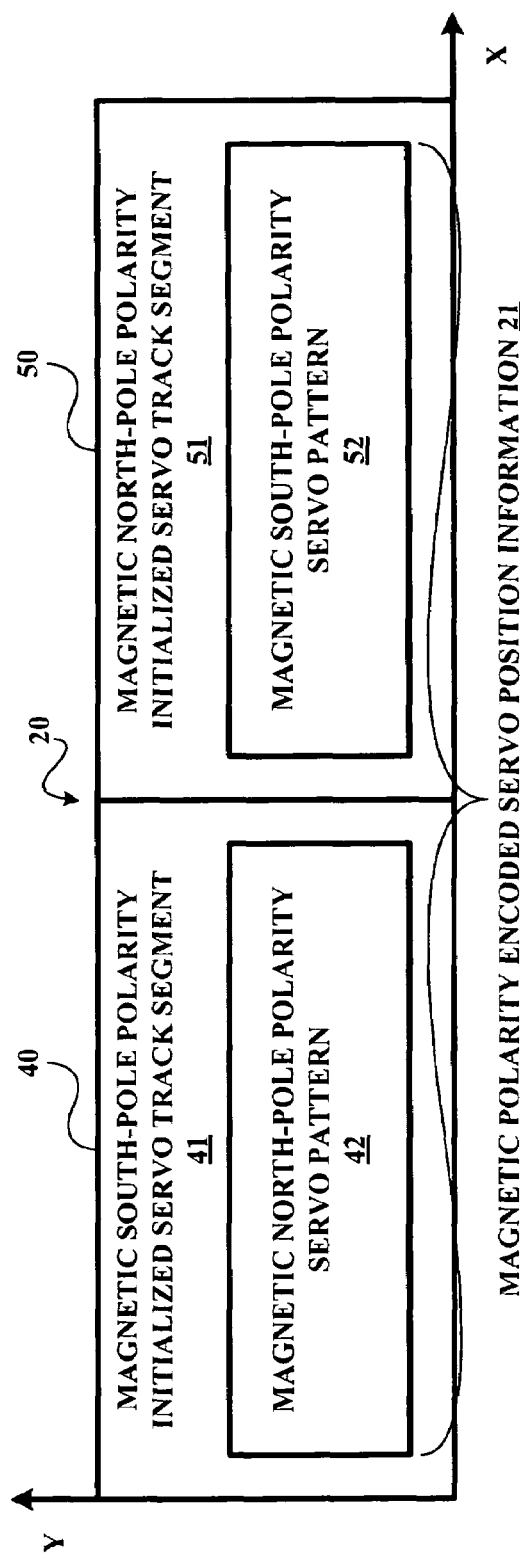
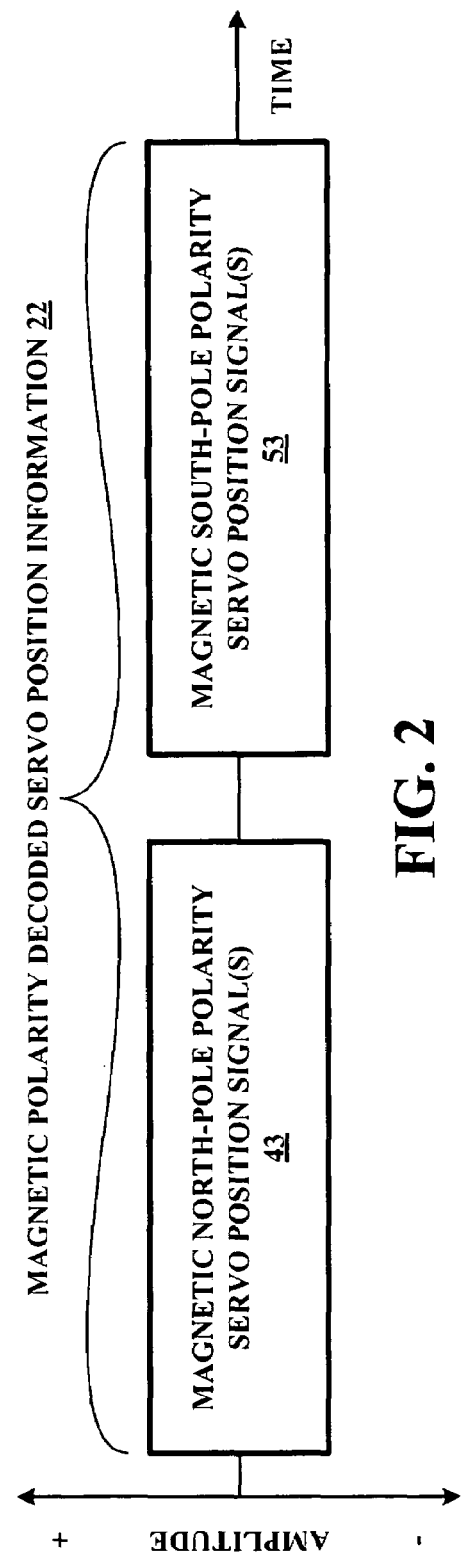
FIG. 1
FIG. 2

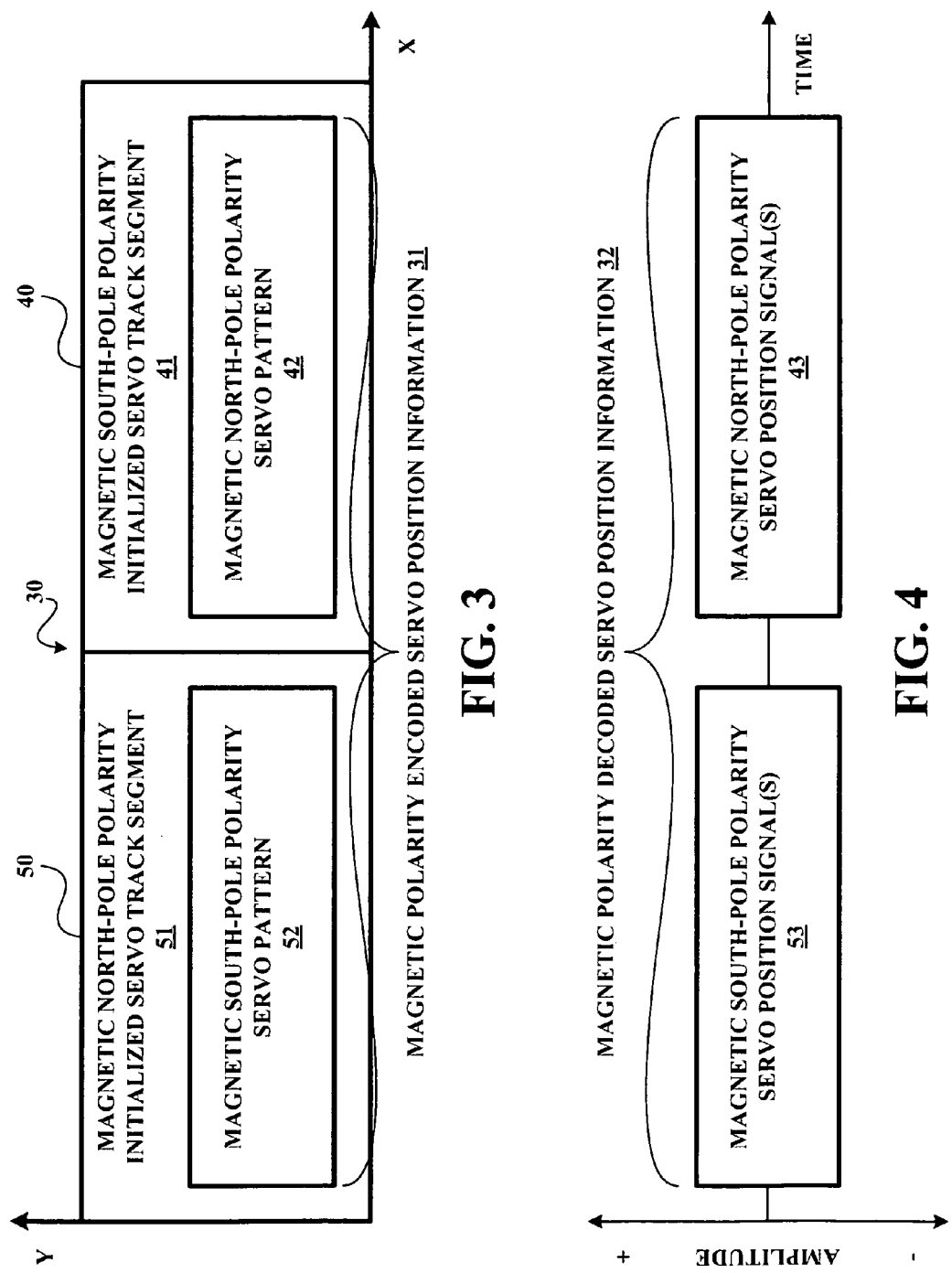

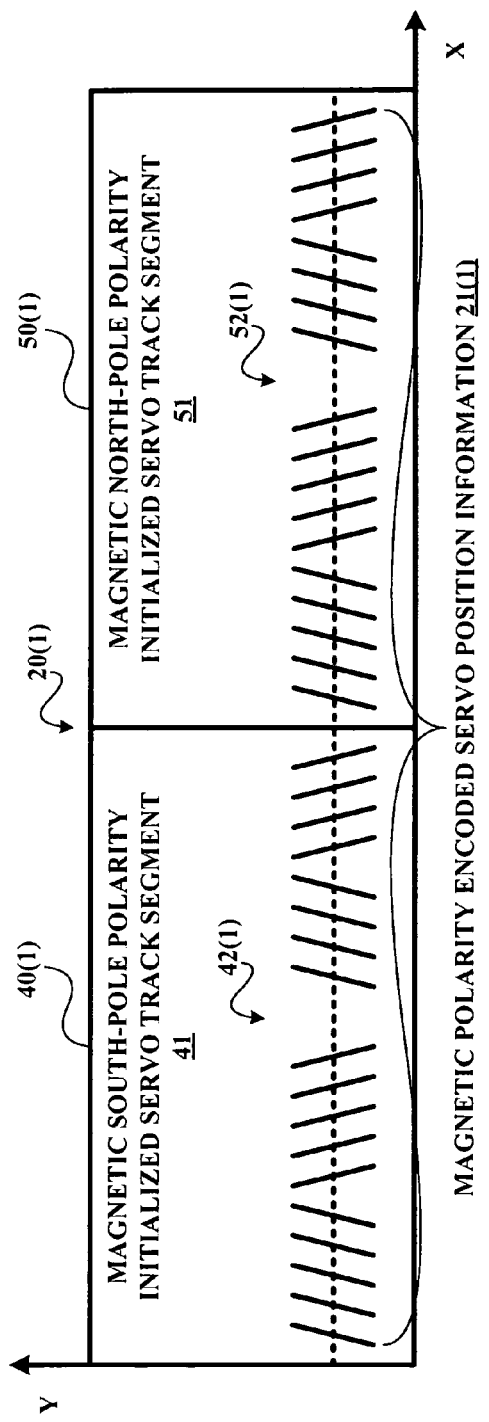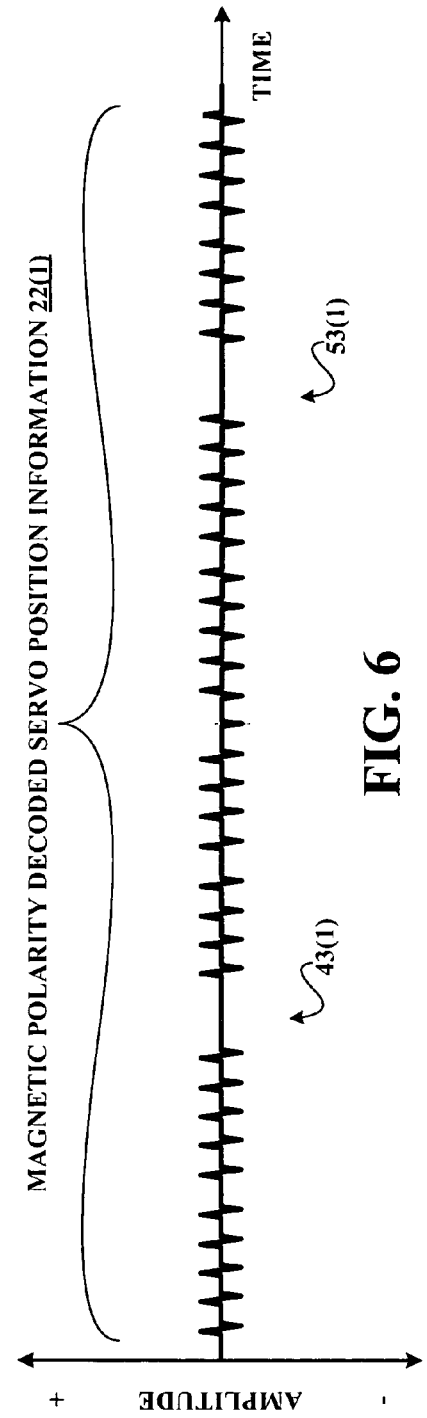

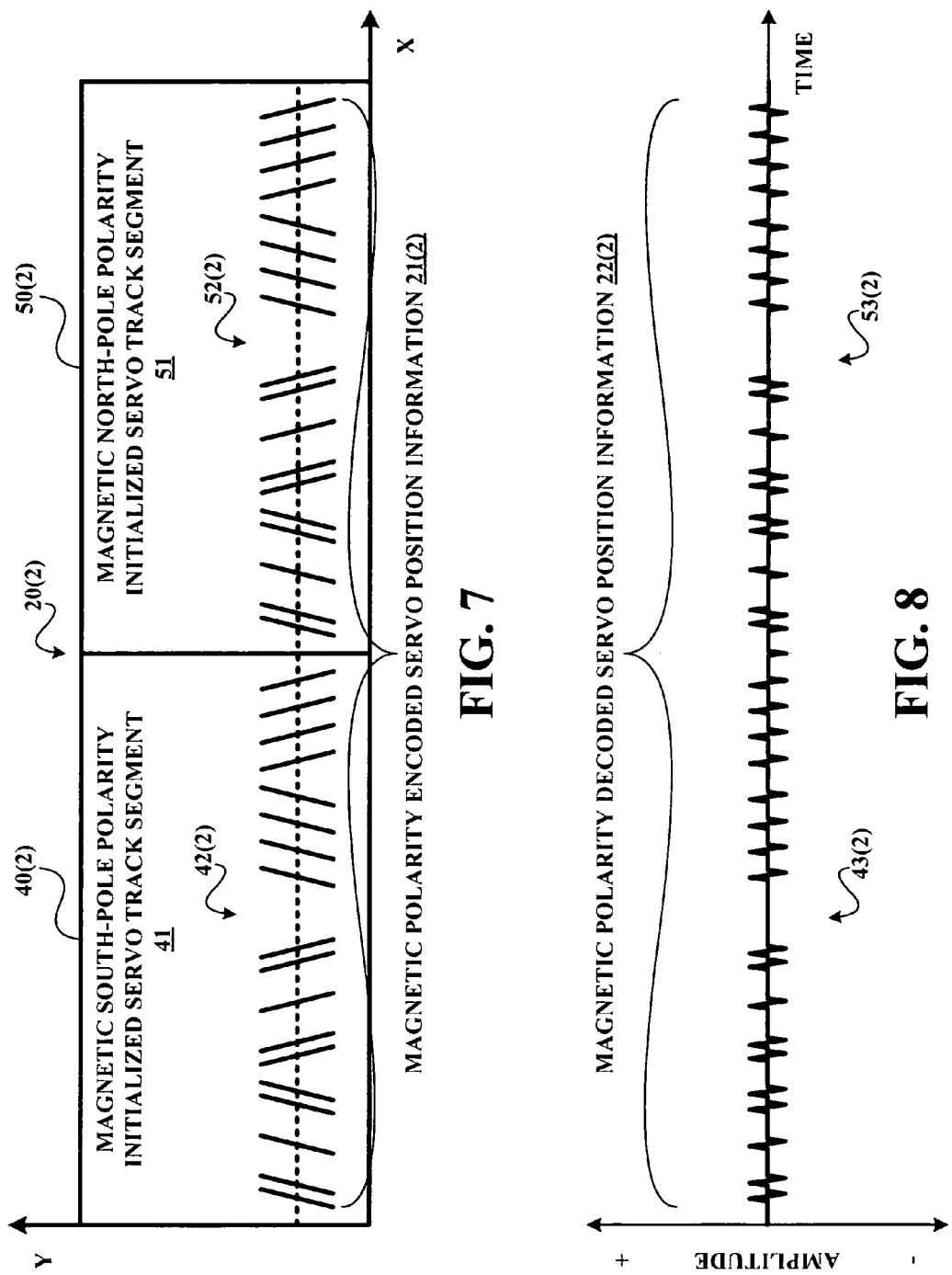

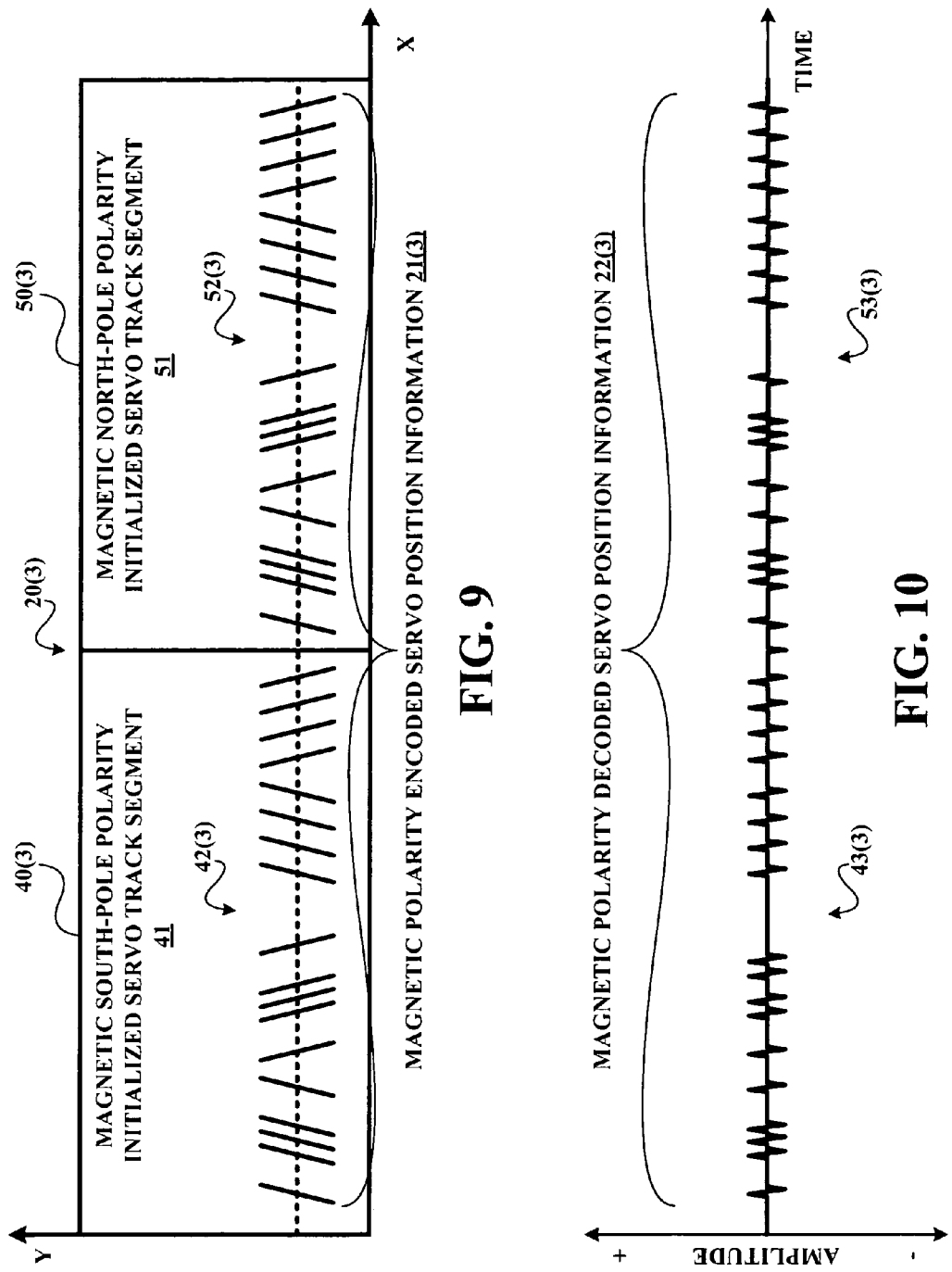

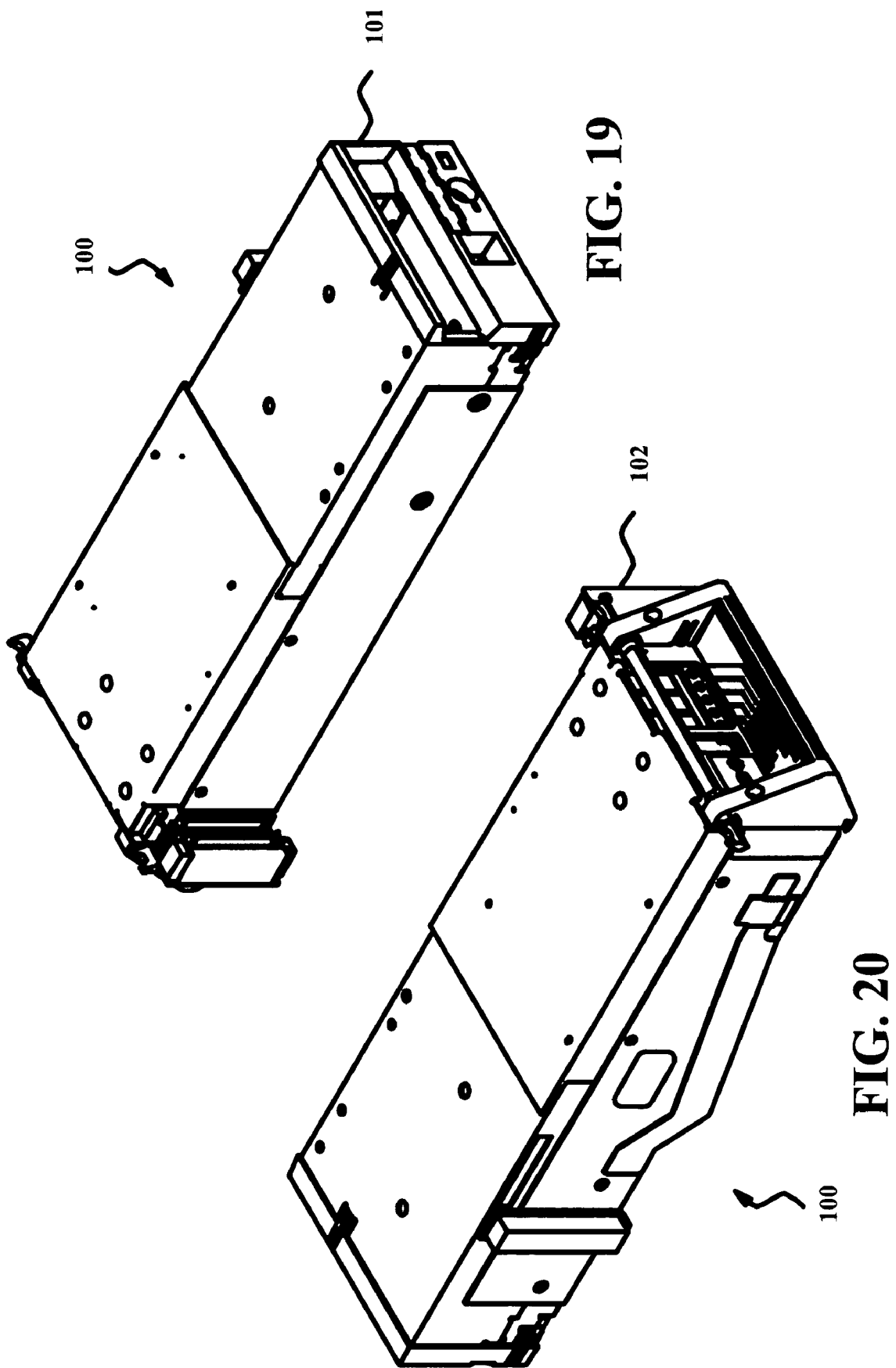

MAGNETIC-POLARITY ENCODED SERVO POSITION INFORMATION FOR MAGNETIC-BASED STORAGE MEDIA

FIELD OF THE INVENTION

The present invention generally relates to servo position information recorded on magnetic-based storage media (e.g., a magnetic tape, a magneto-optical tape and an optical phase-change tape). The present invention specifically relates to a magnetic-polarity encoding of the servo position information as recorded on the magnetic-based storage media.

BACKGROUND OF THE INVENTION

The recording and reading of data in tracks on magnetic storage media requires precise positioning of magnetic read/write heads. Specifically, a magnetic write head must be quickly moved to and centered over a data track to facilitate a selective recording of data onto the data track. In operation, the magnetic write head records data onto the data track as relative movement occurs between the magnetic write head and the magnetic storage media in a transducing direction. Thereafter, the magnetic write head can be moved across the width of the magnetic storage media in a translating direction, which is perpendicular to the transducing direction, to a different data track to thereby selectively record data onto this data track.

Similarly, a magnetic read head must be quickly moved to and centered over a data track to facilitate reading of data recorded on the data track. In operation, the magnetic read head reads data recorded onto the data track as relative movement occurs between the magnetic read head and the magnetic storage media in the transducing direction. Thereafter, the magnetic read head can be moved across the width of the magnetic storage media in the translating direction, which again is perpendicular to the transducing direction, to a different data track to thereby selectively read data recorded onto this data track.

Storage drive devices that employ such magnetic heads for recording data on data tracks of a magnetic storage media and for reading data recorded on the data tracks on magnetic storage media typically use servo control systems to properly position the magnetic heads in the translating direction. A servo control system derives servo position information from a servo read head that reads servo position information recorded in one or more servo tracks that are advantageously recorded among the data tracks of the magnetic storage media. Based on the servo position information, the servo control system properly aligns the servo read head as needed relative to the servo track(s) being read whereby an associated magnetic head will concurrently be properly aligned with a data track for facilitating a recording of data onto that data track or a reading of recorded data from that data track.

A design of a servo pattern for encoding the servo position information is essential to the ability of the servo control system in deriving the servo position information. An example of one type of servo pattern for encoding servo position information is a magnetic timing based servo pattern that facilitates a decoding of servo position information indicating a translational position of the servo read head relative to the magnetic storage media. The magnetic time based servo pattern can further encode the servo position information whereby the decoded servo position information further indicates a transducing position of the servo read head relative to the magnetic storage media.

Another example of a servo pattern for encoding servo position information is a magnetic bit-character differential based servo pattern that facilitates a derivation of servo position information indicating a translational position of the servo read head relative to the magnetic storage media. The magnetic bit-character differential based servo pattern can further encode the servo position information whereby the servo position information further indicates a transducing position of the servo read head relative to the magnetic storage media.

SUMMARY OF THE INVENTION

The present invention provides new and unique magnetic polarity-encoded servo position information that further advances servo control technology.

One form of the present invention is a magnetic storage media comprising a magnetic south-north servo band section and a magnetic north-south servo band section. The magnetic south-north servo band section includes a magnetic south-pole polarity initialized servo track segment and a magnetic north-pole polarity servo pattern recorded on the magnetic south-pole polarity initialized servo track segment. The magnetic north-south servo band section includes a magnetic north-pole polarity initialized servo track segment, and a magnetic south-pole polarity servo pattern recorded on the magnetic north-pole polarity initialized servo track segment. The magnetic south-north servo band section and the magnetic north-south servo band section are recorded relative to each other on a servo track to represent magnetic polarity encoded servo position information based on the magnetic north-pole polarity servo pattern and the magnetic south-pole polarity servo pattern.

A second form of the present invention is a storage media cartridge comprising a cartridge housing adapted to interface with a cartridge drive, and a magnetic storage media contained within the cartridge housing. The magnetic storage media includes a magnetic south-north servo band section and a magnetic north-south servo band section. The magnetic south-north servo band section includes a magnetic south-pole polarity initialized servo track segment and a magnetic north-pole polarity servo pattern recorded on the magnetic south-pole polarity initialized servo track segment. The magnetic north-south servo band section includes a magnetic north-pole polarity initialized servo track segment, and a magnetic south-pole polarity servo pattern recorded on the magnetic north-pole polarity initialized servo track segment. The magnetic south-north servo band section and the magnetic north-south servo band section are recorded relative to each other on a servo track to represent magnetic polarity encoded servo position information based on the magnetic north-pole polarity servo pattern and the magnetic south-pole polarity servo pattern.

A third form of the present invention is a magnetic storage media drive comprising a transducer, a servo detector and a servo controller. The transducer includes a servo read head operable to generate a read head signal representative of a reading of at least one servo pattern recorded on a magnetic storage media including a magnetic south-north servo band section and a magnetic north-south servo band section. The magnetic south-north servo band section includes a magnetic south-pole polarity initialized servo track segment, and a magnetic north-pole polarity servo pattern recorded on the magnetic south-pole polarity initialized servo track segment. The magnetic north-south servo band section includes a magnetic north-pole polarity initialized servo track segment, and a magnetic south-pole polarity servo pattern recorded on the magnetic north-pole polarity initialized servo track segment. The magnetic south-north servo band section and the magnetic north-south servo band section are recorded relative to each other on a servo track to represent magnetic polarity encoded servo position information based on the magnetic north-pole polarity servo pattern and the magnetic south-pole polarity servo pattern. The servo decoder is in electrical communication with the transducer to receive the read head signal, and is operable to generate a decoded servo position signal based on the read head signal, the decoded servo position signal being indicative of a position of the transducer relative to the magnetic storage media. The servo controller is in electrical communication with the servo decoder to receive the decoded servo position signal, and is operable to generate a servo control signal for selectively moving the transducer relative to the magnetic storage media.

The aforementioned forms and additional forms as wells as objects and advantages of the present invention will become further apparent from the following detailed description of the various embodiments of the present invention read in conjunction with the accompanying drawings. The detailed description and drawings are merely illustrative of the present invention rather than limiting, the scope of the present invention being defined by the appended claims and equivalents thereof.

BRIEF DESCRIPTION OF THE DRAWINGS

FIG. 1 illustrates a first embodiment of a magnetic polarity encoded servo position information in accordance with the present invention;

FIG. 2 illustrates exemplary magnetic polarity decoded servo position information associated with the magnetic polarity encoded servo position information illustrated in FIG. 1 in accordance with the present invention;

FIG. 3 illustrates a second embodiment of a magnetic polarity encoded servo position information in accordance with the present invention;

FIG. 4 illustrates exemplary magnetic polarity decoded servo position information associated with the magnetic polarity encoded servo position information illustrated in FIG. 3 in accordance with the present invention;

FIG. 5 illustrates a first exemplary embodiment of the magnetic polarity encoded servo position information illustrated in FIG. 1 in accordance with the present invention;

FIG. 6 illustrates exemplary magnetic polarity decoded servo position information associated with the magnetic polarity encoded servo position information illustrated in FIG. 5 in accordance with the present invention;

FIG. 7 illustrates a second exemplary embodiment of the magnetic polarity encoded servo position information illustrated in FIG. 1 in accordance with the present invention;

FIG. 8 illustrates exemplary magnetic polarity decoded servo position information associated with the magnetic polarity encoded servo position information illustrated in FIG. 7 in accordance with the present invention;

FIG. 9 illustrates a third exemplary embodiment of the magnetic polarity encoded servo position information illustrated in FIG. 1 in accordance with the present invention;

FIG. 10 illustrates exemplary magnetic polarity decoded servo position information associated with the magnetic polarity encoded servo position information illustrated in FIG. 9 in accordance with the present invention;

FIGS. 19 and 20 respectively illustrate a front view and rear view of one embodiment of a tape drive in accordance with the present invention.

DETAILED DESCRIPTION OF THE PRESENT INVENTION

Figure 11:
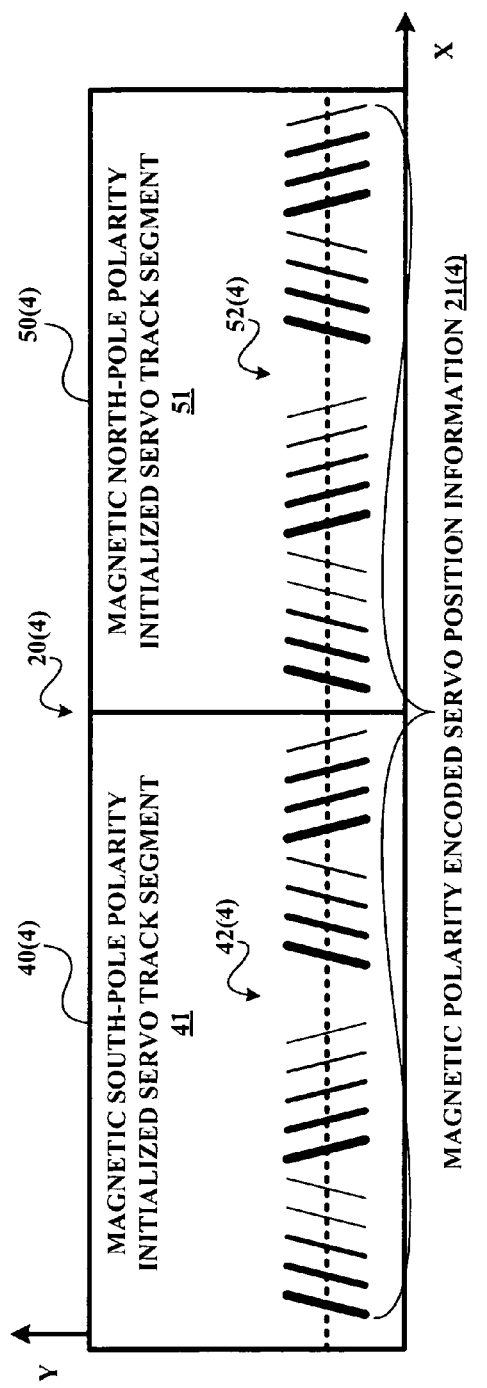
FIG. 11 illustrates a fourth exemplary embodiment of the magnetic polarity encoded servo position information illustrated in FIG. 1 in accordance with the present invention.

FIG. 1 illustrates a magnetic servo band 20 of the present invention employing a magnetic south-north servo band section 40 and a magnetic north-south servo band section 50 as recorded on a servo track of a magnetic storage media (not shown). Magnetic south-north servo band section 40 includes a magnetic south-pole polarity initialized servo track segment 41 and a magnetic north-pole polarity servo pattern 42 recorded on magnetic south-pole polarity initialized servo track segment 41. Magnetic north-south servo band section 50 includes a magnetic north-pole polarity initialized servo track segment 51, and a magnetic south-pole polarity servo pattern 52 recorded on magnetic north-pole polarity initialized servo track segment 51.

Magnetic south-north servo band section 40 and magnetic north-south servo band section 50 are recorded relative to each other on a servo track to represent magnetic polarity encoded servo position information 21 based on magnetic north-pole polarity servo pattern 42 and magnetic south-pole polarity servo pattern 52. In one embodiment, magnetic south-north servo band section 40 and magnetic north-south servo band section 50 are bordering each other on the servo track as shown in FIG. 1. In an alternative embodiment, magnetic south-north servo band section 40 and magnetic north-south servo band section 50 can be spaced from each other on the servo track.

In operation, a first servo read of magnetic south-north servo band section 40 generates one or more magnetic north-pole polarity servo position signals 43 as shown in FIG. 2 in dependence upon the format of magnetic north-pole polarity servo pattern 42. Similarly, a second servo read of magnetic north-south servo band section 50 generates one or more magnetic south-pole polarity servo position signals 53 as shown in FIG. 2 in dependence upon the format of magnetic south-pole polarity servo pattern 52. Collectively, magnetic north-pole polarity servo position signals 43 and magnetic south-pole polarity servo position signals 53 represent magnetic polarity decoded servo position information 22 for facilitating a determination of a translational position of a servo transducer (not shown) along a translation axis Y. Magnetic polarity decoded servo position information 22 may also facilitate a determination of a transducing position of the servo transducer along a transducing axis X in dependence upon the format of magnetic north-pole polarity servo pattern 42 and/or the format of magnetic south-pole polarity servo pattern 52.

FIG. 3 illustrates a magnetic servo band 30 of the present invention employing a reverse order of magnetic south-north servo band section 40 and magnetic north-south servo band section 50 as recorded on a servo track of a magnetic storage media (not shown). In this embodiment, magnetic south-north servo band section 40 and magnetic north-south servo band section 50 are recorded relative to each other on the servo track to represent magnetic polarity encoded servo position information 31 based on the reverse order of magnetic north-pole polarity servo pattern 42 and the magnetic south-pole polarity servo pattern 52. In one embodiment, magnetic south-north servo band section 40 and magnetic north-south servo band section 50 are bordering each other on the servo track as shown in FIG. 3. In an alternative embodiment, magnetic south-north servo band section 40 and magnetic north-south servo band section 50 can be spaced from each other on the servo track.

In operation, a first servo read of magnetic north-south servo band section 50 generates one or more magnetic south-pole polarity servo position signals 53 as shown in FIG. 4 in dependence upon the format of magnetic south-pole polarity servo pattern 52. Similarly, a second servo read of magnetic south-north servo band section 40 generates one or more magnetic north-pole polarity servo position signals 43 as shown in FIG. 4 in dependence upon the format of magnetic north-pole polarity servo pattern 42. Collectively, magnetic south-pole polarity servo position signals 53 and magnetic north-pole polarity servo position signals 43 represent magnetic polarity decoded servo position information 32 for facilitating a determination of a translational position of a servo transducer (not shown) along a translation axis Y. Magnetic polarity decoded servo position information 32 may also facilitate a determination of a transducing position of the servo transducer along a transducing axis X in dependence upon the format of magnetic north-pole polarity servo pattern 42 and/or the format of magnetic south-pole polarity servo pattern 52.

Referring to FIGS. 1 and 3, in practice, the present invention does not impose any limitations or any restrictions as to the format of magnetic north-pole polarity servo pattern 42 and as to the format of magnetic south-pole polarity servo pattern 52. For example, the format of magnetic north-pole polarity servo pattern 42 may or may not be identical to the format of magnetic south-pole polarity servo pattern 52. As such, the following description of exemplary embodiments of patterns 42 and 52 as shown in FIGS. 5, 7, 9, 11 and 13 does not limit nor restrict the scope of the format of patterns 42 and 52.

FIG. 5 illustrates a basic timing based servo embodiment of the present invention. In this embodiment, from left-to-right, a magnetic north-pole polarity servo pattern 42(1) includes a standard A-burst of five (5) magnetic north-pole polarity forward-slash stripes (/////), a standard B-burst of five (5) magnetic north-pole polarity backward-slash stripes (\\\\\), a standard C-burst of four (4) magnetic north-pole polarity forward-slash stripes (////) and a standard D-burst of four (4) magnetic north-pole polarity backward-slash stripes (\\\\) as would be appreciated by those having ordinary skill in the art. Similarly, a magnetic south-pole polarity servo pattern 52(1) includes a standard A-burst of five (5) magnetic south-pole polarity forward-slash stripes (//////), a standard B-burst of five (5) magnetic south-pole polarity backward-slash stripes (\\\\\), a standard C-burst of four (4) magnetic south-pole polarity forward-slash stripes (/////) and a standard D-burst of four (4) magnetic south-pole polarity backward-slash stripes (\\\\) as would be appreciated by those having ordinary skill in the art.

In operation, a first servo read of magnetic south-north servo band section 40(1) generates magnetic north-pole polarity servo position signals 43(1) as shown in FIG. 6 that are representative of the time based servo format of magnetic north-pole polarity servo pattern 42(1). Similarly, a second servo read of magnetic north-south servo band section 50(1) generates one or more magnetic south-pole polarity servo position signals 53(1) as shown in FIG. 6 that are representative of the time based servo format of magnetic south-pole polarity servo pattern 52(1). Collectively, magnetic north-pole polarity servo position signals 43(1) and magnetic south-pole polarity servo position signals 53(1) represent magnetic polarity decoded servo position information 22(1) for facilitating a determination of a translational position of a servo transducer (not shown) along a translation axis Y as would be appreciated by those having ordinary skill in the art. Magnetic polarity decoded servo position information 22(1) may also facilitate a determination of a coarse transducing position of the servo transducer along a transducing axis X as would be appreciated by those having ordinary skill in the art.

FIG. 7 illustrates an alphanumeric "1" encoded timing based servo embodiment of the present invention. In this embodiment, a magnetic north-pole polarity servo pattern 42(2) includes an alphanumeric "1" encoded A-burst of five (5) magnetic north-pole polarity forward-slash stripes (/////), an alphanumeric "1" B-burst of five (5) magnetic north-pole polarity backward-slash stripes (\\\\\), a standard C-burst of four (4) magnetic north-pole polarity forward-slash stripes (/////) and a standard D-burst of four (4) magnetic north-pole polarity backward-slash stripes (\\\\) as would be appreciated by those having ordinary skill in the art. Similarly, a magnetic south-pole polarity servo pattern 52(2) includes an alphanumeric "1" encoded A-burst of five (5) magnetic south-pole polarity forward-slash stripes (//////), an alphanumeric "1" B-burst of five (5) magnetic south-pole polarity backward-slash stripes (\\\\\), a standard C-burst of four (4) magnetic south-pole polarity forward-slash stripes (/////) and a standard D-burst of four (4) magnetic south-pole polarity backward-slash stripes (\\\\) as would be appreciated by those having ordinary skill in the art.

In operation, a first servo read of magnetic south-north servo band section 40(2) generates magnetic north-pole polarity servo position signals 43(2) as shown in FIG. 8 that are representative of the alphanumeric "1" encoded time based servo format of magnetic north-pole polarity servo pattern 42(2). Similarly, a second servo read of magnetic north-south servo band section 50(2) generates one or more magnetic south-pole polarity servo position signals 53(2) as shown in FIG. 8 that are representative of the alphanumeric "1" encoded time based servo format of magnetic south-pole polarity servo pattern 52(2). Collectively, magnetic north-pole polarity servo position signals 43(2) and magnetic south-pole polarity servo position signals 53(2) render magnetic polarity encoded servo position information 22(2) for facilitating a determination of a translational position of a servo transducer (not shown) along a translation axis Y. Magnetic polarity encoded servo position information 22(2) also facilitates a determination of a refined transducing position of the servo transducer along a transducing axis X.

FIG. 9 illustrates an alphanumeric "0" encoded timing based servo embodiment of the present invention. In this embodiment, a magnetic north-pole polarity servo pattern 42(3) includes an alphanumeric "0" encoded A-burst of five (5) magnetic north-pole polarity forward-slash stripes (/////), an alphanumeric "0" encoded B-burst of five (5) magnetic north-pole polarity backward-slash stripes (\\\\\), a standard C-burst of four (4) magnetic north-pole polarity forward-slash stripes (////) and a standard D-burst of four (4) magnetic north-pole polarity backward-slash stripes (\\\\) as would be appreciated by those having ordinary skill in the art. Similarly, a magnetic south-pole polarity servo pattern 52(3) includes an alphanumeric "0" encoded A-burst of five (5) magnetic south-pole polarity forward-slash stripes (/////), an alphanumeric "0" encoded B-burst of five (5) magnetic south-pole polarity backward-slash stripes (\\\\\), a standard C-burst of four (4) magnetic south-pole polarity forward-slash stripes (////) and a standard D-burst of four (4) magnetic south-pole polarity backward-slash stripes (\\\\) as would be appreciated by those having ordinary skill in the art.

In operation, a first servo read of magnetic south-north servo band section 40(3) generates magnetic north-pole polarity servo position signals 43(3) as shown in FIG. 10 that are representative of the alphanumeric "0" encoded time based servo format of magnetic north-pole polarity servo pattern 42(3). Similarly, a second servo read of magnetic north-south servo band section 50(3) generates one or more magnetic south-pole polarity servo position signals 53(3) as shown in FIG. 10 that are representative of the alphanumeric "0" encoded time based servo format of magnetic south-pole polarity servo pattern 52(3). Collectively, magnetic north-pole polarity servo position signals 43(3) and magnetic south-pole polarity servo position signals 53(3) represent magnetic polarity decoded servo position information 22(3) for facilitating a determination of a translational position of a servo transducer (not shown) along a translation axis Y. Magnetic polarity decoded servo position information 22(3) also facilitates a determination of a refined transducing position of the servo transducer along a transducing axis X.

FIG. 11 illustrates a magnetic intensity encoded timing based servo embodiment of the present invention. In this embodiment, a magnetic north-pole polarity servo pattern 42(4) includes a magnetic intensity encoded A-burst of five (5) magnetic north-pole polarity forward-slash stripes (/////), a magnetic intensity encoded B-burst of five (5) magnetic north-pole polarity backward-slash stripes (\\\\\), a magnetic intensity encoded C-burst of four (4) magnetic north-pole polarity forward-slash stripes (////) and a magnetic intensity encoded D-burst of four (4) magnetic north-pole polarity backward-slash stripes (\\\\) as would be appreciated by those having ordinary skill in the art. Similarly, a magnetic south-pole polarity servo pattern 52(4) includes a magnetic intensity encoded A-burst of five (5) magnetic south-pole polarity forward-slash stripes (/////), a magnetic intensity encoded B-burst of five (5) magnetic south-pole polarity backward-slash stripes (\\\\\), a magnetic intensity encoded C-burst of four (4) magnetic south-pole polarity forward-slash stripes (////) and a magnetic intensity encoded D-burst of four (4) magnetic south-pole polarity backward-slash stripes (\\\\) as would be appreciated by those having ordinary skill in the art.

For the illustrated embodiment, the magnetic intensity pattern for the A-B burst pair involves the outermost stripes having the highest magnetic intensity and the innermost strips having the lowest magnetic intensity as would be appreciated by those having ordinary skill in the art. Similarly, the magnetic intensity pattern for C-D burst pair involves the outermost stripes having the highest magnetic intensity and the innermost strips having the having the lowest magnetic intensity as would be appreciated by those having ordinary skill in the art. In practice, the present invention does not impose any limitations or any restrictions to the magnetic intensity pattern adopted for the A-B burst pair and the C-D burst pair.

Figure 12:
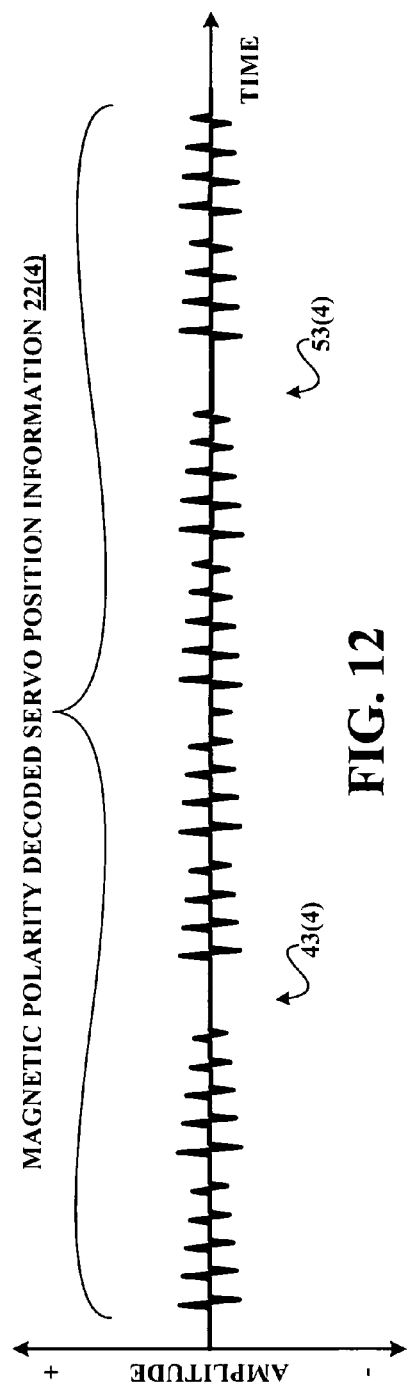
FIG. 12 illustrates exemplary magnetic polarity decoded servo position information associated with the magnetic polarity encoded servo position information illustrated in FIG. 11 in accordance with the present invention.

In operation, a first servo read of magnetic south-north servo band section 40(4) generates magnetic north-pole polarity servo position signals 43(4) as shown in FIG. 12 that are representative of the magnetic intensity encoded time based servo format of magnetic north-pole polarity servo pattern 42(4). Similarly, a second servo read of magnetic north-south servo band section 50(4) generates one or more magnetic south-pole polarity servo position signals 53(4) as shown in FIG. 12 that are representative of the magnetic intensity encoded time based servo format of magnetic south-pole polarity servo pattern 52(4). Collectively, magnetic north-pole polarity servo position signals 43(4) and magnetic south-pole polarity servo position signals 53(4) represent magnetic polarity decoded servo position information 22(4) for facilitating a determination of a translational position of a servo transducer (not shown) along a translation axis Y. Magnetic polarity decoded servo position information 22(4) also facilitates a determination of a refined transducing position of the servo transducer along a transducing axis X.

Figure 13:
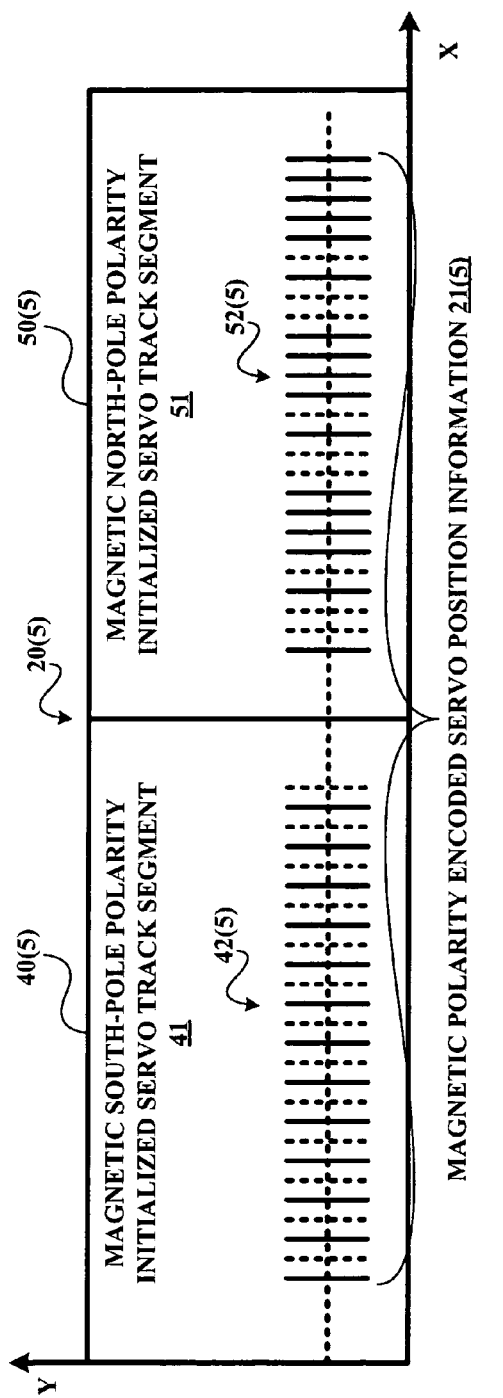
FIG. 13 illustrates a fifth exemplary embodiment of the magnetic polarity encoded servo position information illustrated in FIG. 1 in accordance with the present invention.

FIG. 13 illustrates a magnetic bit-character differential servo pattern based servo embodiment of the present invention. In this embodiment, a magnetic north-pole polarity servo pattern 42(5) includes a magnetic bit-character pattern 10101010101010101010101010 of magnetic north-pole polarity stripes as would be appreciated by those having ordinary skill in the art. Similarly, a magnetic south-pole polarity servo pattern 52(5) includes a different magnetic bit-character pattern 100101111001011111001011111 of magnetic south-pole polarity stripes as would be appreciated by those having ordinary skill in the art.

Figure 14:
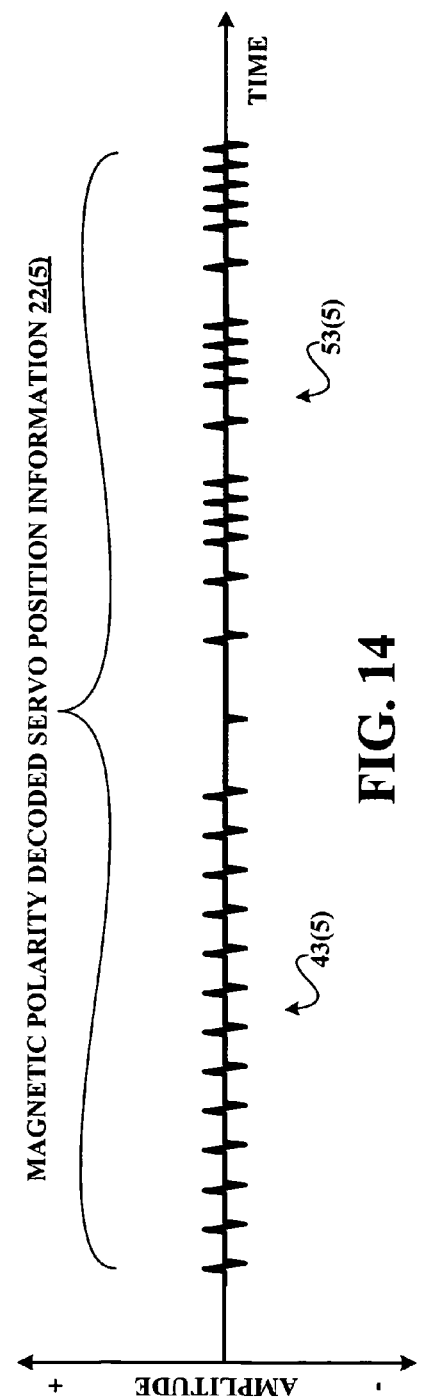
FIG. 14 illustrates exemplary magnetic polarity decoded servo position information associated with the magnetic polarity encoded servo position information illustrated in FIG. 13 in accordance with the present invention.

In operation, a first servo read of magnetic south-north servo band section 40(5) generates magnetic north-pole polarity servo position signals 43(5) as shown in FIG. 14 that are representative of the magnetic bit-character servo format of magnetic north-pole polarity servo pattern 42(5). Similarly, a second servo read of magnetic north-south servo band section 50(5) generates one or more magnetic south-pole polarity servo position signals 53(5) as shown in FIG. 14 that are representative of the different magnetic bit-character based servo format of magnetic south-pole polarity servo pattern 52(5). Collectively, magnetic north-pole polarity servo position signals 43(5) and magnetic south-pole polarity servo position signals 53(5) represent magnetic polarity decoded servo position information 22(5) for facilitating a determination of a translational position of a servo transducer (not shown) along a translation axis Y. Magnetic polarity decoded servo position information 22(5) may also facilitate a determination of a refined transducing position of the servo transducer along a transducing axis X.

Referring to FIGS. 1 and 3, those having ordinary skill in the art will appreciate the unlimited variations in servo patterns 42 and 52 as evidenced by FIGS. 5, 7, 9, 11 and 13. Those having ordinary skill in the art will further appreciate the numerous advantages of the present invention, such as, for example, an ability to implement a servo control system in an uncomplicated yet innovative manner.

Figure 15:
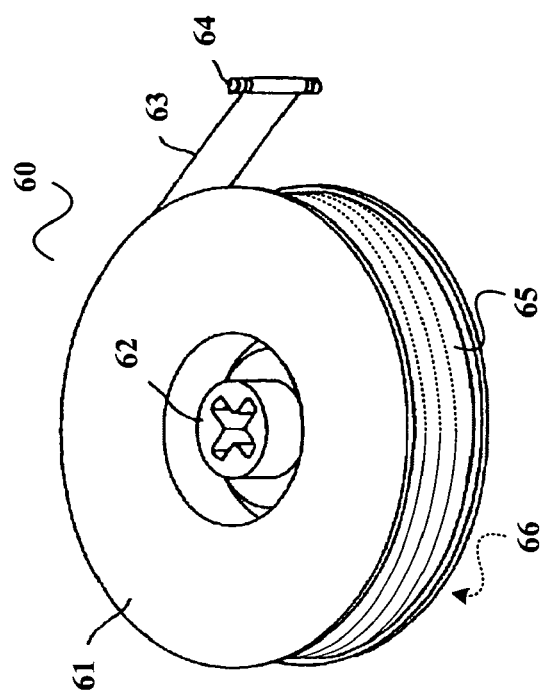
FIG. 15 illustrates one embodiment of a tape storage media in accordance with the present invention.
Figure 16:
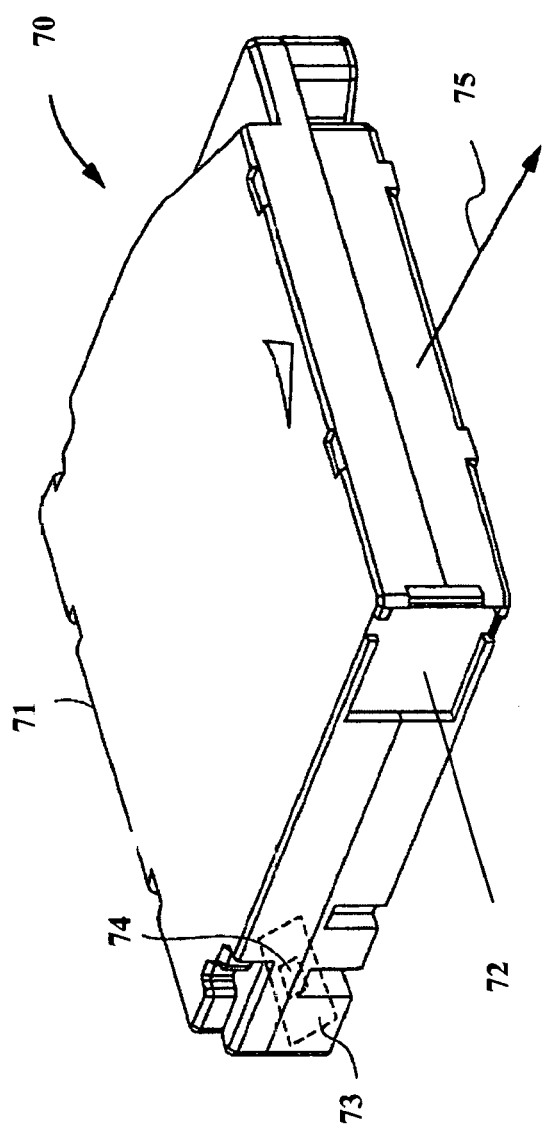
FIG. 16 illustrates one embodiment of a tape storage cartridge in accordance with the present invention.

FIGS. 15 and 16 respectively illustrate a tape storage media 60 as an exemplary form of a magnetic storage media for practicing the inventive principles of the present invention as previously described herein, and a tape storage cartridge 70 as an exemplary form of a magnetic storage cartridge for practicing the inventive principles of the present invention as previously described herein. Tape storage media 60 is contained with a shell housing 71 of tape storage cartridge 70 that is adapted to interface with a tape drive (not shown).

Specifically, tape cartridge 70 includes exterior cartridge shell 71 and sliding door 72. Sliding door 72 is slid open when tape cartridge 70 is inserted into a tape drive (not shown). Sliding door 72 is normally closed when tape cartridge 70 is not in use, so that debris and contaminants do not enter tape cartridge 70 and degrade tape storage media 60. The direction that tape cartridge 70 is slid into the tape drive is shown as direction 75. Tape cartridge 70 also contains a cartridge memory 74, which is on a printed circuit board 73. Cartridge memory 74 is preferably at a 45° angle, to allow the tape drive and pickers of an automated storage library (not shown) to access the contents of cartridge memory 74.

Tape storage media 60 includes a tape reel 61, which is prevented from rotation by a brake button 62 when tape cartridge 70 is inserted in a tape drive (not shown). The tape drive releases brake button 62 when tape cartridge 70 is inserted into the tape drive, which then allows the free rotation of tape reel 61. Tape reel 61 is wound with tape 65, which is preferably magnetic tape. Alternatively, tape 65 could equally be magneto-optical or optical phase-change tape. On the free end of tape 65 is an optional leader tape 63 and leader pin 64. When tape cartridge 70 is slid into the tape drive, sliding door 72 is opened, and the tape drive threads leader pin 64 and attached leader tape 63 and tape 65 through the tape path. Tape 65 may be a data tape or a cleaner tape. Tape 65 may use the identical formulation of tape for both data and cleaning purposes. The contents of cartridge memory 74 are used to distinguish tape cartridge 70 as either a data cartridge or a cleaner cartridge. Optional leader tape 63 is preferably a thicker section of tape 65 which better withstands the load/unload operations of the tape drive.

As related to the a servo control of tape 65, servo tracks 66 are recorded on tape 65 in accordance with the inventive principles of the present invention. In particular, one or more servo bands implementing a version of the FIG. 1 servo band embodiment and/or a version of the FIG. 2 servo band embodiment are recorded on servo tracks 66 to thereby facilitate an advantageous execution of a servo control of tape 65.

Figure 17:
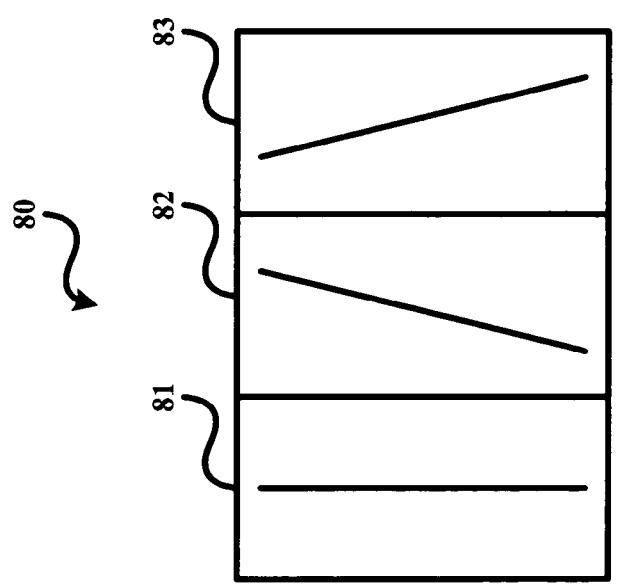
FIG. 17 illustrates one embodiment of a servo write head in accordance with the present invention.

FIG. 17 illustrates a servo write head 80 as an exemplary form of a servo write head for practicing the inventive principles of the present invention as previously described herein as related to FIGS. 5, 7, 9 and 11. Servo write head 80 includes an erase element 81, a backward-slash stripe write element 82 and a forward-slash stripe write element 83. In operation, a servo track segment of a magnetic storage media (e.g., media 60) is initialized in either a magnetic north-pole polarity or a magnetic south-pole polarity by a selectively pre-erasing of the servo track segment in either a magnetic north-pole polarity or a magnetic south-pole polarity. Next, a version of a time based servo pattern of the present invention can be recorded in the opposite magnetic polarity onto the pre-erased servo track segment. In an alternate embodiment, an additional element 81 (not shown) is added next to stripe write element 83 to facilitate an erasing and writing of the timing based servo pattern in either direction of magnetic tape 65.

Figure 18:
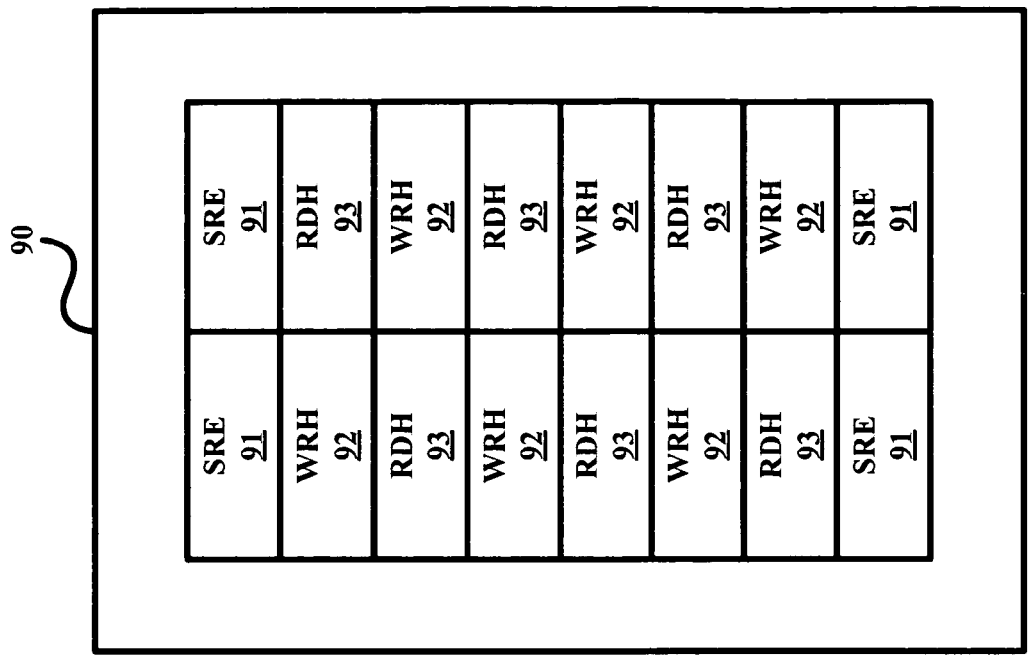
FIG. 18 illustrates one embodiment of a servo transducer in accordance with the present invention.

FIG. 18 illustrates a servo transducer 90 as an exemplary form of a servo transducer for practicing the inventive principles of the present invention as previously described herein. Servo transducer 90 includes servo read elements ("SRE") 91, write heads ("WRH") 92 and read heads ("RDH") 93 in an arrangement that facilitates a use of elements 91 in properly positioning heads 92 and 93 along a desired data track for performing a read-after-write technique as data is being recorded on that data track.

FIGS. 19 and 20 respectively illustrate a front end 101 and rear end 102 of a tape drive 100. Installed within tape drive 100 is a servo control system for positioning a transducer (e.g., transducer 90 shown in FIG. 18) adjacent a surface of a tape storage media (e.g., tape storage media 60 shown in FIG. 15) whereby one or more servo read heads of the transducer are operable to read servo patterns 42 and 52 (FIG. 1) of the present invention as recorded on one or more servo tracks of the tape storage media.

Figure 21:
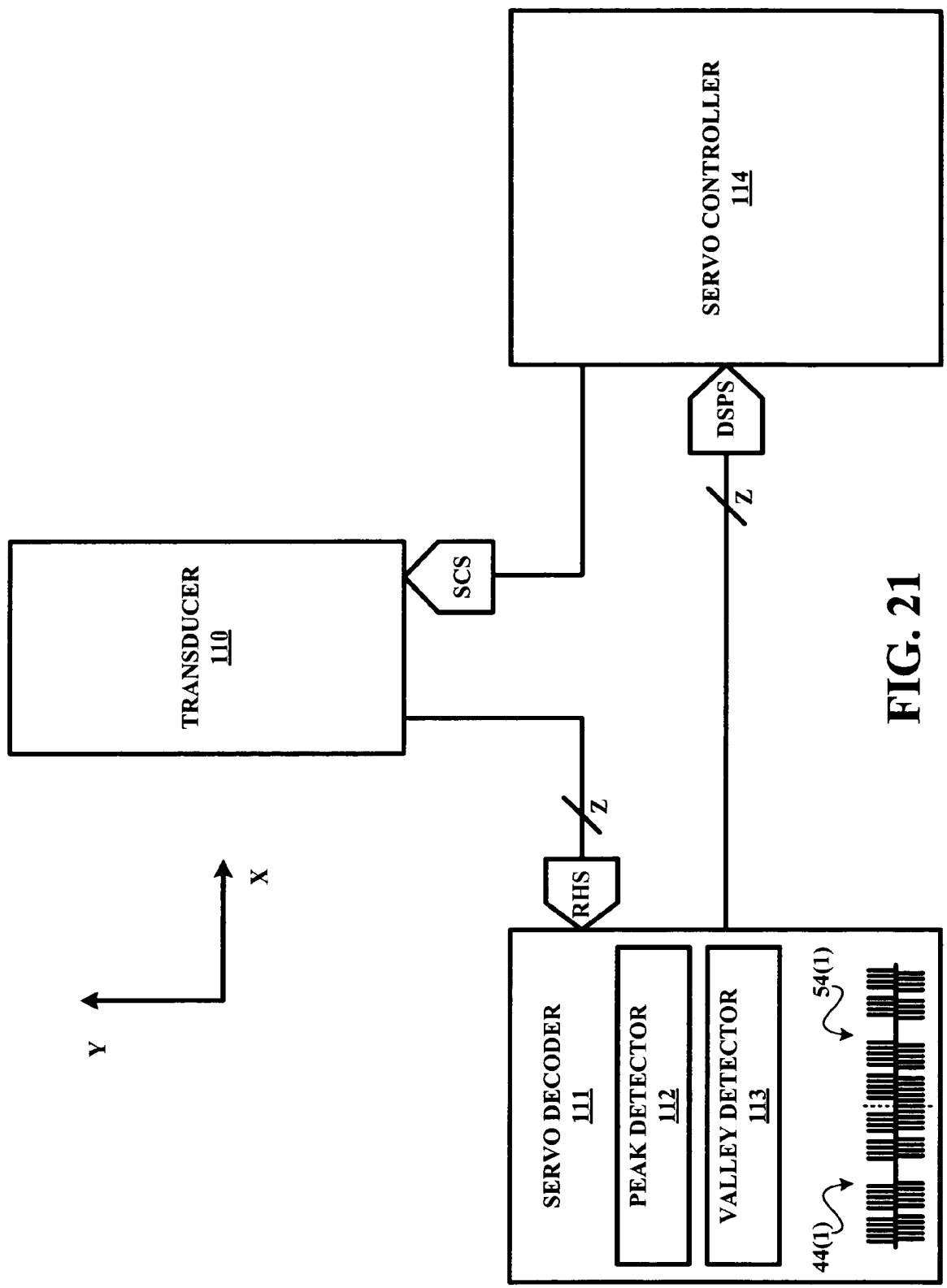
FIG. 21 illustrates one embodiment of a servo control system in accordance with the present invention.

FIG. 21 illustrates an exemplary servo control system of the present invention employing a transducer 110 (e.g., transducer 90 shown in FIG. 18), a servo decoder 111 and a servo controller 114. Transducer 110 includes one or more servo read heads whereby each servo read head is operable to read servo patterns 42 and 52 of the present invention as recorded on a servo track of the tape storage media to thereby generate a read head signal RHS representative of servo patterns 42 and 52. Servo decoder 111 decodes each read head signal RHS and generates a decoded servo position signal DSPS that indicates a position of the corresponding servo read head relative to tape storage media. Servo controller 114 is operable to generate a servo control signal SCS based on each decoded servo position signal DSPS generated by servo decoder 111 whereby a translation assembly (not shown) of transducer 110 is selectively activated in response to servo control signal SCS to thereby move transducer 110 relative to the tape storage media along translation axis Y as needed.

In order to decode each read head signal RHS, servo decoder 111 employs a peak detector 112 and a valley detector 113 per each servo read head of transducer 110. Each peak detector 112 generates a peak detection signal and each valley detector 113 generates a valley detection signal whereby the peak detection signal(s) and the valley detection signal(s) are further processed to generate the decoded servo position signal(s) DSPS as would be appreciated by those having ordinary skill in the art. Specifically, peak detector 112 and valley detector 113 act in combination to detect the peak-valley-peak-valley representative of position signals 43 (FIG. 2) and the valley-peak-valley-peak representative of position signals 53 (FIG. 2). In this way, drive 100 both gathers the decoded servo position signal DSPS and differentiates between servo pattern 42 (FIG. 1) and servo pattern 52 (FIG. 1). For example, peak detector 112 and valley detector 113 act in combination to detect the peak-valley-peak-valley representative 44(1) of position signals 43(1) (FIG. 6) and the valley-peak-valley-peak representative 54(1) of position signals 53(1) (FIG. 6). As such, drive 100 both gathers decoded servo position signal DSPS and differentiates between servo pattern 42(1) (FIG. 5) and servo pattern 52(1) (FIG. 5). Additionally, the amplitude of the peaks and valleys can be detected to differentiate between position signals 43 and 53, in particular position signals 43(4) and position signals 53(4) shown in FIG. 12.

Those having ordinary skill in the art of servo control techniques may develop other embodiments of the invention in view of the inventive principles of the present invention described herein. The terms and expression which have been employed in the foregoing specification are used herein as terms of description and not of limitations, and there is no intention in the use of such terms and expressions of excluding equivalents of the features shown and described or portions thereof, it being recognized that the scope of the invention is defined and limited only by the claims which follow.

We claim:

1. A magnetic storage media, comprising:
    a magnetic south-north servo band section including a magnetic south-pole polarity initialized servo track segment, and a magnetic north-pole polarity servo pattern recorded on the magnetic south-pole polarity initialized servo track segment;

a magnetic north-south servo band section including a magnetic north-pole polarity initialized servo track segment, and a magnetic south-pole polarity servo pattern recorded on the magnetic north-pole polarity initialized servo track segment; and wherein the magnetic south-north servo band section and the magnetic north-south servo band section are recorded relative to each other on a servo track to represent magnetic polarity encoded servo position information based on the magnetic north-pole polarity servo pattern and the magnetic south-pole polarity servo pattern.

2. The magnetic storage media of claim 1, wherein the magnetic north-pole polarity servo pattern is a magnetic north-pole polarity timing based servo pattern.

3. The magnetic storage media of claim 1, wherein the magnetic north-pole polarity servo pattern is a magnetic north-pole polarity encoded timing based servo pattern.

4. The magnetic storage media of claim 3, wherein an encoding of the magnetic north-pole polarity encoded timing based servo pattern is at least one of an alphanumeric based encoding and a magnetic intensity based encoding.

5. The magnetic storage media of claim 1, wherein the magnetic north-pole polarity servo pattern is a magnetic north-pole polarity bit-character based servo pattern.

6. The magnetic storage media of claim 1, wherein the magnetic south-pole polarity servo pattern is a magnetic south-pole polarity timing based servo pattern.

7. The magnetic storage media of claim 1, wherein the magnetic south-pole polarity servo pattern is a magnetic south-pole polarity encoded timing based servo pattern.

8. The magnetic storage media of claim 3, wherein an encoding of the magnetic south-pole polarity encoded timing based servo pattern is at least one of an alphanumeric based encoding and a magnetic intensity based encoding.

9. The magnetic storage media of claim 1, wherein the magnetic south-pole polarity servo pattern is a magnetic south-pole polarity bit-character based servo pattern.

10. The magnetic storage media of claim 1, wherein the magnetic storage media is a magnetic tape media.

11. A magnetic storage media cartridge, comprising:

a cartridge housing adapted to interface with a cartridge drive; and a magnetic storage media contained within the cartridge housing, the magnetic storage media including:

a magnetic south-north servo band section including a magnetic south-pole polarity initialized servo track segment, and a magnetic north-pole polarity servo pattern recorded on the magnetic south-pole polarity initialized servo track segment;

a magnetic north-south servo band section including a magnetic north-pole polarity initialized servo track segment, and a magnetic south-pole polarity servo pattern recorded on the magnetic north-pole polarity initialized servo track segment; and wherein the magnetic south-north servo band section and the magnetic north-south servo band section are recorded relative to each other on a servo track to represent magnetic polarity encoded servo position information based on the magnetic north-pole polarity servo pattern and the magnetic south-pole polarity servo pattern.

12. The magnetic storage media cartridge of claim 11, wherein the magnetic north-pole polarity servo pattern is a magnetic north-pole polarity timing based servo pattern.

13. The magnetic storage media cartridge of claim 11, wherein the magnetic north-pole polarity servo pattern is a magnetic north-pole polarity encoded timing based servo pattern.

14. The magnetic storage media cartridge of claim 13, wherein an encoding of the magnetic north-pole polarity encoded timing based servo pattern is at least one of an alphanumeric based encoding and a magnetic intensity based encoding.

15. The magnetic storage media cartridge of claim 11, wherein the magnetic north-pole polarity servo pattern is a magnetic north-pole polarity bit-character based servo pattern.

16. The magnetic storage media cartridge of claim 11, wherein the magnetic south-pole polarity servo pattern is a magnetic south-pole polarity timing based servo pattern.

17. The magnetic storage media cartridge of claim 11, wherein the magnetic south-pole polarity servo pattern is a magnetic south-pole polarity encoded timing based servo pattern.

18. The magnetic storage media cartridge of claim 17, wherein an encoding of the magnetic south-pole polarity encoded timing based servo pattern is at least one of an alphanumeric based encoding and a magnetic intensity based encoding.

19. The magnetic storage media cartridge of claim 11, wherein the magnetic south-pole polarity servo pattern is a magnetic south-pole polarity bit-character based servo pattern.

20. A magnetic storage media drive, comprising:

a transducer including a servo read head operable to generate a read head signal representative of a reading of at least one servo pattern recorded on a magnetic storage media including a magnetic south-north servo band section including a magnetic south-pole polarity initialized servo track segment, and a magnetic north-pole polarity servo pattern recorded on the magnetic south-pole polarity initialized servo track segment, a magnetic north-south servo band section including a magnetic north-pole polarity initialized servo track segment, and a magnetic south-pole polarity servo pattern recorded on the magnetic north-pole polarity initialized servo track segment, and wherein the magnetic south-north servo band section and the magnetic north-south servo band section are recorded relative to each other on a servo track to represent magnetic polarity encoded servo position information based on the magnetic north-pole polarity servo pattern and the magnetic south-pole polarity servo pattern;

a servo decoder in electrical communication with the transducer to receive the read head signal, the servo decoder being operable to generate a decoded servo position signal based on the read head signal, the decoded servo position signal being indicative of a position of the transducer relative to the magnetic storage media; and a servo controller in electrical communication with the servo decoder to receive the decoded servo position signal, the servo controller being operable to generate a servo control signal for selectively moving the transducer relative to the magnetic storage media.

* * * * *